United States Patent [19]
Kobzan

[11] Patent Number: 6,149,762
[45] Date of Patent: Nov. 21, 2000

[54] WELDING NOZZLE FOR WELDING MACHINE FOR THERMOPLASTIC MATERIAL

[75] Inventor: John Kobzan, LaGrange, Ill.

[73] Assignee: Clements National Company, Chicago, Ill.

[21] Appl. No.: 09/114,669

[22] Filed: Jul. 13, 1998

[51] Int. Cl.[7] .................................................. B32B 31/00
[52] U.S. Cl. ......................... 156/497; 156/499; 156/544; 156/574
[58] Field of Search .................................. 156/497, 499, 156/544, 574; 239/592

[56] References Cited

U.S. PATENT DOCUMENTS

| D. 294,362 | 2/1988 | Sinclair | D15/144 |
|---|---|---|---|
| 4,440,588 | 4/1984 | Stevenson et al. | |
| 4,855,044 | 8/1989 | Chitjian | |
| 5,399,226 | 3/1995 | Chapman | 156/408 |
| 5,935,357 | 8/1999 | Hubbard et al. | 156/82 |

OTHER PUBLICATIONS

Perry's Chemical Engineers' Handbook—Sixth Edition, p. 5–50, 1984.

Cadillac Products, Clements National Company, 1996, "Double Eagle Modified Bitumen Hot–Air Seam Welder," Advertisment.

*Primary Examiner*—Richard Crispino
*Assistant Examiner*—Sue A. Purvis
*Attorney, Agent, or Firm*—Hill & Simpson

[57] ABSTRACT

A nozzle includes a body, a substantially rectangular foot, air slots and a flow restrictor. The body directs a stream of hot air into the substantially rectangular foot. The foot has a top and bottom surface that includes air slots. The foot also has an outlet across one end for the air flow. A flow restrictor is positioned in the foot, substantially along the outlet to create a back flow of pressure within the foot. The back flow of air causes an even distribution of air across the foot and out the air slots. Thus, increasing radiant heat across the surfaces of the foot.

4 Claims, 3 Drawing Sheets

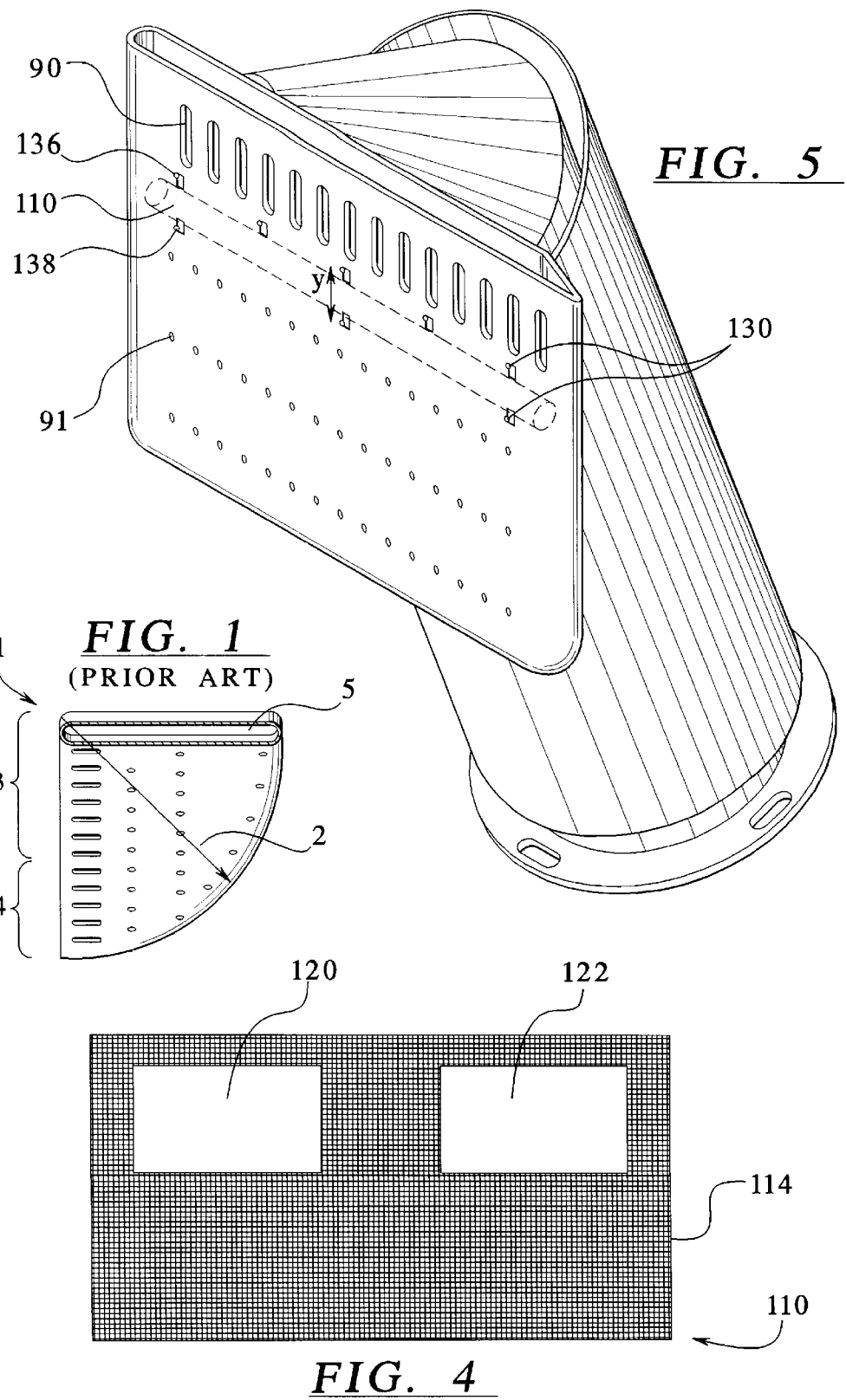

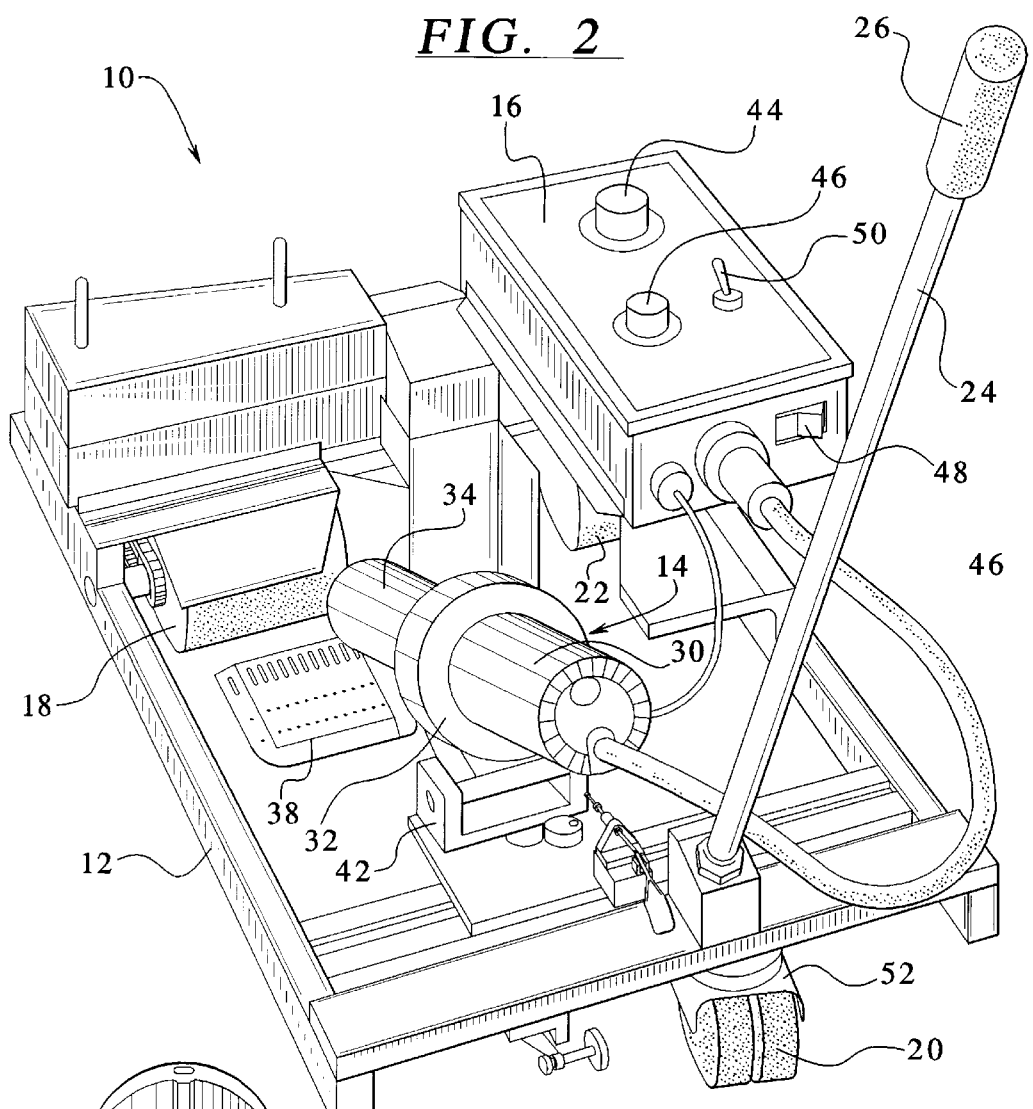
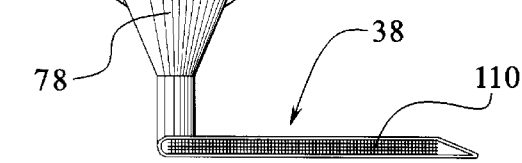

WELDING NOZZLE FOR WELDING MACHINE FOR THERMOPLASTIC MATERIAL

BACKGROUND OF THE INVENTION

The present invention relates generally to apparatus for welding together overlapped thermoplastic sheeting. Specifically, to a nozzle for such apparatus.

The use of geomembrane thermoplastic roof sealing material and industrial fabric-type material in sheet form has become increasingly popular. Such material, which generally comprises PVC, HDPE or the like, is typically provided in rolls. The material is laid down in strips and adjoining overlapped edges of the sheet material are welded by the application of heat to provide watertight seams. The resulting welded sheet material offers durable, long-lasting protection at relatively little expense and requiring little maintenance.

Various devices are known for welding the overlapped seams of thermoplastic material. Typically, such devices have a frame, wheels, hot air gun and welding nozzle. For example, Chitjian, U.S. Pat. No. 4,855,004, fully incorporated by reference and assigned to the assignee of the present invention, discloses such an apparatus.

Another example of a known seam welding device is disclosed in Stephenson et al., U.S. Pat. No. 4,440,588, entitled, "Hot Air Welder for Welding Roof Material", incorporated herein by reference. The disclosed apparatus includes a blower communicating with a heater assembly mounted on a chassis which includes a pressure wheel and a tracking wheel. The welder accommodates inside and outside seams.

Another example of a known hot-air seam welder marketed by the assignee as Model 2515 of its Cadillac® Products line includes a nozzle arrangement reproduced in FIG. 1 of the drawings accompanying this specification. Specifically, FIG. 1 shows a foot of the nozzle that is at the lower end of a nozzle body. Hot air passes through the nozzle body into the nozzle foot. The nozzle foot includes air slots across the width of the nozzle foot and spaced from the end thereof and vents on the upper and lower surfaces of the foot. The air slots and vents provide some preheating air to the thermoplastic roofing material as the foot passes between overlapped sheets. The main stream of the heated air is directed out the outlet of the foot. Heat is transferred to the sheets mostly through convection. There is relatively low radiant heat transfer by the nozzle surface.

As can be seen in FIG. 1, the nozzle foot 1 has a rounded shape similar to that of a quarter circle, in planar view, having a radius 2. The nozzle foot in FIG. 1 is divided, for purposes of explanation, into two Areas: Area 3 and Area 4. Air passes into the foot via the opening 5 positioned across the top of the foot. However, due to the rounded wall at the back of the foot 1, the airstream exhibits a river bend effect in which the stream concentrates along the rounded back wall. The result is a concentration of airflow in Area 4. A concentration of air flow in Area 4 is problematic because it may cause overheating of the equipment.

Another problem that occurs is that, while there is a concentration of airflow in Area 4, there is not enough heat in Area 3. Uneven distribution of air flow is undesirable because it causes uneven heating of the material. This problem is even more pronounced in nozzles that are 3 inches and wider. Clearly, for wide nozzles it is impossible to evenly heat the sheet in the width required (4 to 5 inches). Although there may be different combinations of holes to increase heat transfer, due to the low pressure inside the nozzle it is not possible to increase heat transfer substantially.

Also, the average welding speed is about 10 feet per minute, which translates into approximately 2 inches per second. The average distance from nozzle opening to the pinch rollers is a maximum 1 inch, but usually only about ½ to ¾ of an inch. Thus, with the known devices, a user is only allowed approximately 0.2 to 0.3 seconds to properly heat the thermoplastic material.

It is desirable to increase the time for heating the thermoplastic material and to increase the radiant heat transfer across the nozzle foot. Further, it is desirable to provide an even output flow of heat across the nozzle foot output area between Areas 3 and 4. Uneven distribution of heat transfer across the weld area as well as in the output flow of hot air results in uneven seams between the thermoplastic sheets. Thus, there is room for improvement from the existing nozzles.

SUMMARY OF THE INVENTION

The present invention provides a nozzle for hot air thermoplastic sheeting welding apparatus.

To this end, in an embodiment of the present invention, a welding apparatus for welding together overlapped thermoplastic sheets includes a frame, a hot air source, a nozzle and a flow restrictor. The frame is designed to be movable relative to the thermoplastic sheets and the hot air source is carried on the frame. The nozzle directs the stream of hot air generated by the hot air source. The nozzle includes a first end that is attached to the hot air source and a second end that is substantially rectangular. The second end also has an outlet. Further, the second end is configured as a welding member that is positioned between the thermoplastic sheets. The flow restrictor is positioned in the second end so that a back flow of pressure is created.

In an embodiment, the flow restrictor is a heat resistant material.

In an embodiment, the flow restrictor is positioned substantially across the outlet.

In an embodiment, the invention further includes air vents on top and bottom surfaces of the second end through which hot air can be vented.

In an embodiment, the flow restrictor is a wire mesh that is rolled into a tubular shape.

In an embodiment, the flow restrictor is removable and insertable within the second end of the nozzle.

In an embodiment of the present invention, a nozzle for a welding apparatus includes a body to direct a stream of hot air, a substantially rectangular foot, air vents on top and bottom surfaces of the foot and a flow restrictor. The flow restrictor is positioned in the foot to cause a sufficiently even distribution of air flow out the air vents.

In an embodiment, the flow restrictor and rectangular foot are one piece.

In an embodiment, the flow restrictor is positioned downstream from the air vents.

In an embodiment, the foot further includes air slots on the top and bottom surfaces and the flow restrictor is between the air slots and the air vents.

In an embodiment, the flow restrictor is positioned upstream from the air slots.

It is, therefore, an advantage of the present invention to provide a nozzle for a welding apparatus that creates a back flow of pressure within the nozzle.

Another advantage of the present invention is to provide a nozzle for a welding apparatus that restricts the output of air at the outlet of the nozzle.

Yet, another advantage of the present invention is to provide a nozzle for a welding apparatus that evenly distributes the output of air at the air vents.

A further advantage of the present invention is to provide a nozzle for a welding apparatus that evenly distributes the output of air across the outlet.

Another advantage of the present invention is to provide a nozzle for a welding apparatus that slows down the speed of the air through the nozzle.

Yet another advantage of the present invention is to provide a nozzle for a welding apparatus that increases the time for heating the thermal plastic material.

Yet another advantage of the present invention is to provide a nozzle for a welding apparatus that increases the heat transfer by radiation.

A further advantage of the present invention is to provide a nozzle for a welding apparatus that evens out the heat transfer across the weld area.

A still further advantage provides for preheating of the thermoplastic material by both convection and radiation. Thus, reclaiming more available heat.

These and other advantages and/or features of the present invention are described below in the following detailed description of the presently preferred embodiments with reference to the accompanying drawings.

DETAILED DESCRIPTION OF THE DRAWINGS

FIG. 1 is a plan view of a known nozzle foot.

FIG. 2 is a perspective view of a seam welding apparatus incorporating the inventive nozzle.

FIG. 4 is a plan view of the flow restrictor that can be used in the nozzle of FIG. 3.

FIG. 5 is a bottom perspective view of the nozzle of FIG. 3.

FIG. 6 is a front view of the nozzle of FIG. 3.

DETAILED DESCRIPTION OF THE PREFERRED EMBODIMENTS

Figure 3:
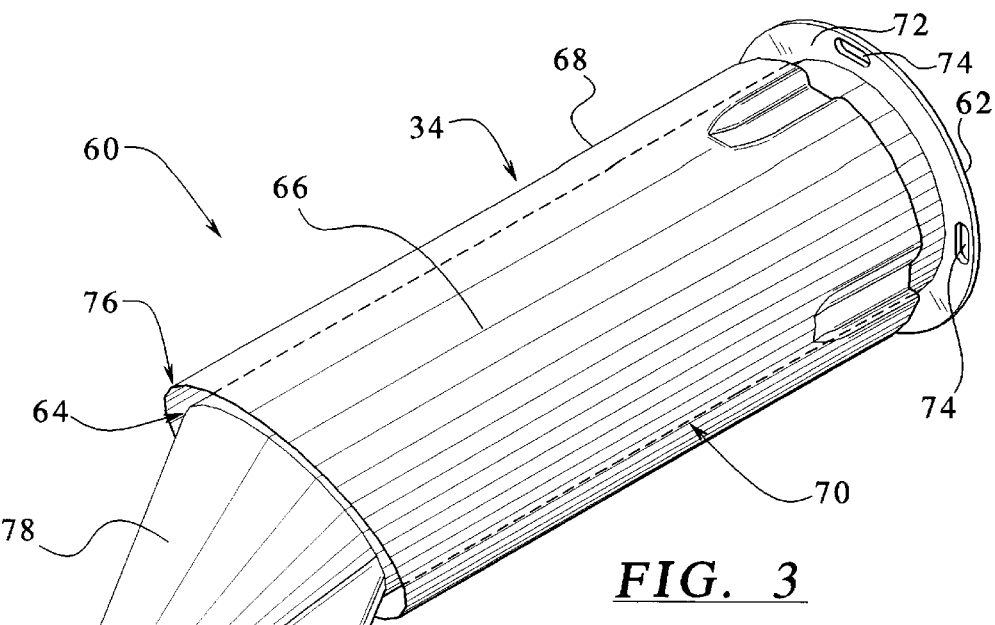
FIG. 3 is a perspective view of the nozzle of the apparatus of FIG. 1.

Generally, FIGS. 2 through 7 illustrate a welding apparatus and nozzle incorporating principles of the invention.

Specifically, FIG. 2 shows a seam welding machine 10 incorporating the inventive nozzle. The seam welding machine 10 includes a frame 12, a hot air source 14, and a controls enclosure 16. The frame 12 rides on a set of wheels 18, 20 and 22. Extending generally upward from the frame 12 is a guide handle 24, at the end of which is a grip 26. A heat gun or hot air source 14 for purposes of the invention is intended to mean any suitable device that generates a source of hot air sufficient for seam welding equipment.

In FIG. 2, the hot air source 14 of the seam welding machine 10 includes a motor housing portion 30 mounted to one side of an impeller housing 32. A nozzle body 34 is mounted to the other end of the housing. At the lower end of the nozzle body 34 is a foot 38 embodying principles of the invention, this foot 38 is further described in FIG. 3 through FIG. 7.

The entire hot air source 14 is mounted to the frame 12 by a gimble mount 42 so that the hot air source 14 may be pivoted between an operative position and an inoperative position. Control and power connections between the hot air source 14 and the instrument enclosure 16 are provided by a multiconductor cable 46. The control instrument enclosure 16 is mounted above the drive housing (not shown). The control instrument enclosure 16 includes a pair of top-mounted control knobs 44 and 46 for adjusting the speed and temperature of the seam welder 10. Also mounted on the enclosure 16 is an on-off switch 48 and another switch 50.

The wheel 20 which is mounted by a caster bracket 52 to the underside of the frame 12 is in alignment with the guide handle 24. Thus, the two driven wheels 18 and 22 in combination with the caster wheel 20 in alignment with the guide handle 24 enable the unit 10 to be guided easily, such as along an edge of overlapped roofing material.

FIGS. 3 through 7 illustrate an embodiment of a nozzle 60 embodying principles of the invention. In particular, the perspective view in FIG. 3 shows the nozzle body 34 having a first end 62, a second end 64, and a hollow core 66 extending between the first end 62 and the second end 64. The elongated body 34 may be generally tubular in shape. The elongated body 34 has an outer heat shield shell 68 that surrounds an inner tubular body 70.

The inner tubular body 70 extends beyond the outer shell 68 to the first end 62 of the nozzle body 34. The first end 62 has a lip 72 that extends perpendicular from the tubular body 70. The lip 72, in turn, has mounting holes 74 distributed around the lip 72. The mounting holes 74 allow the nozzle 60 to be secured to the hot air source 14. Of course, other means for mounting the nozzle 60 to the hot air source may be substituted. For example, a latching mechanism may be incorporated. Generally, the nozzle body 34 is made of a metal, e.g. a stainless steel material.

The inner tubular body 70 extends beyond an end 76 of the outer shell 68 into the second end 64 of the nozzle body 34. The second end 64 of the nozzle body 34 has a tapered section 78 that tapers into the foot 38. Thus, the foot 38 is an extension of the inner tubular body 70. In a preferred embodiment, the foot 38 and the inner tubular body 70 are made out of the same material and as one part, i.e. a unitary member. However, other embodiments may incorporate a similar design made from two separate parts secured together.

The foot 38 is substantially rectangular in shape. The foot 38 has a top 82 and a bottom 84 surface. The top surface 82 is embossed in order to raise the thermoplastic material over the foot 38 and is further illustrated in FIG. 7. The surfaces 82, 84 include air slots 90 and vents 91 of varying dimensions across a width X of the foot 38 and spaced from the end thereof. The foot 38 also has an outlet port 94. The outlet port 94 extends across one end 96 of the foot 38 and defines the width of the welding seam.

As the hot air source 14 generates a stream of hot air, the hot air travels down the inner tubular body 70 into the tapered section 78. The tapered section 78 funnels the air stream into the foot 38 at one end 100. This taper helps concentrate the air flow thereby increasing the velocity of the air flow. In the illustrated embodiment, the tapered section 78 does not extend completely across the end 100 of the foot 38.

The substantially rectangular shape of the foot 38 is advantageous in that it uniformly distributes the air stream throughout the foot 38. Further, as the air stream is distributed throughout the foot 38, some air exits through the air vents 91 to provide hot air to preheat the thermoplastic roofing material prior to encountering the direct heated air stream from the outlet 94.

A flow restrictor 1 10 is positioned substantially along the outlet 94 of the foot 38, just prior to the air slots 90. Generally, the flow restrictor 110 is positioned within the foot 38 between one end 96 of the foot and one end 112 of the tapered section 78. Thus, the air flow from the tapered section 78 into the foot 38 cannot bypass the flow restrictor 110, except, of course via the air vents 91. The flow restrictor 110 is designed to reduce the output of air at the outlet 94. In addition, the flow restrictor 110 creates a back pressure within the foot 38 while at the same time permits a desirable amount of air flow out the outlet 94. The back pressure is necessary to evenly distribute the back flow of air and, in turn, increase the radiant heat across the top 82 and bottom 84 surfaces of the foot 38. The increase in radiant heat transfer provides for more efficient preheating of the thermoplastic material. This is especially prevalent in applications that require sheets that are at least 4 to 5 inches in width to be heated evenly.

A particular flow restrictor 110 is illustrated in FIG. 4. In FIG. 4, the flow restrictor 110 is made from a stainless steel mesh material 114. The mesh material 114 is, generally, a rectangular shape. A portion of the mesh material 114 is cut out. The cut out portion in the embodiment in FIG. 4 is in two sections 120,122. Other embodiments may have only one section cut out or may have more than two sections cutout. The size and number of cut out portions 120,122 directly relate to the increase or decrease of air flow pattern at the outlet 94.

Of course, the air flow can be infinitely modified, by changing the restrictivity of the flow restrictor 110. For example, the mesh size may vary depending on the desired air flow through the outlet as well as the back pressure created within the foot. To this end, for any given mesh size, the restrictivity of the flow restrictor may also be determined by the tightness of the rolling of the screen. Additionally, other embodiments of the flow restrictor 110 may be used instead of the wire mesh 114. The flow restrictor material need only be made of a suitable thermal resistant material. Thus, another such example may be a ceramic embodiment (or steel rod) that is manufactured in a tubular shape and incorporates air passages through the ceramic (or steel). Further, other embodiments may incorporate the flow restrictor and foot as one piece. For example, a flow restrictor can be created by appropriate "pinching" of the outlet 94.

During the manufacturing process of the invention, it is necessary to position the flow restrictor 110 within the foot 38. Thus, the wire mesh 114 in FIG. 4 is rolled into a "cigarette" shape having a diameter D as is shown in FIGS. 3 and 5. The flow restrictor 110 is then inserted into the outlet 94 of the foot 38. The cigarette-shaped wire mesh 114 allows for a desirable amount of airflow to escape through the outlet 94 while at the same time blocks a sufficient amount of air to create a back flow of air thus increasing the air pressure within the foot 38.

The flow restrictor 110 is secured within the foot 38 by tabs 130 as shown in FIG. 5. The tabs 130 are on both the bottom and top surfaces 82, 84 of the foot 38. In a preferred embodiment, the tabs 130 are punched inwardly from the material on the foot 38. As a result, small tabs 130 protrude from the inside of the foot 38. The tabs 130 form two parallel rows on each surface 82,84. A width Y separates the two rows. The width Y is directly related to the diameter D of the cigarette-shaped flow restrictor 110. Generally, it is necessary to increase the number of tabs 130 on a downstream side 136 of the foot 38 verses an upstream side 138. This increase in tabs 130 at the downstream side 136 will prevent slippage of the flow restrictor 110 due to the air flow. The flow restrictor 110 thus is removable and replaceable.

FIG. 6 shows a front view of the assembled invention. Here, the flow restrictor 110 is positioned within the foot 38. A feature of the wire mesh embodiment of the flow restrictor 110 is that it extends to the end of the foot and can be flattened at the end of the cigarette-shape to accommodate variations in foot shape. FIG. 6 illustrates this tapering of the wire mesh.

Figure 7:
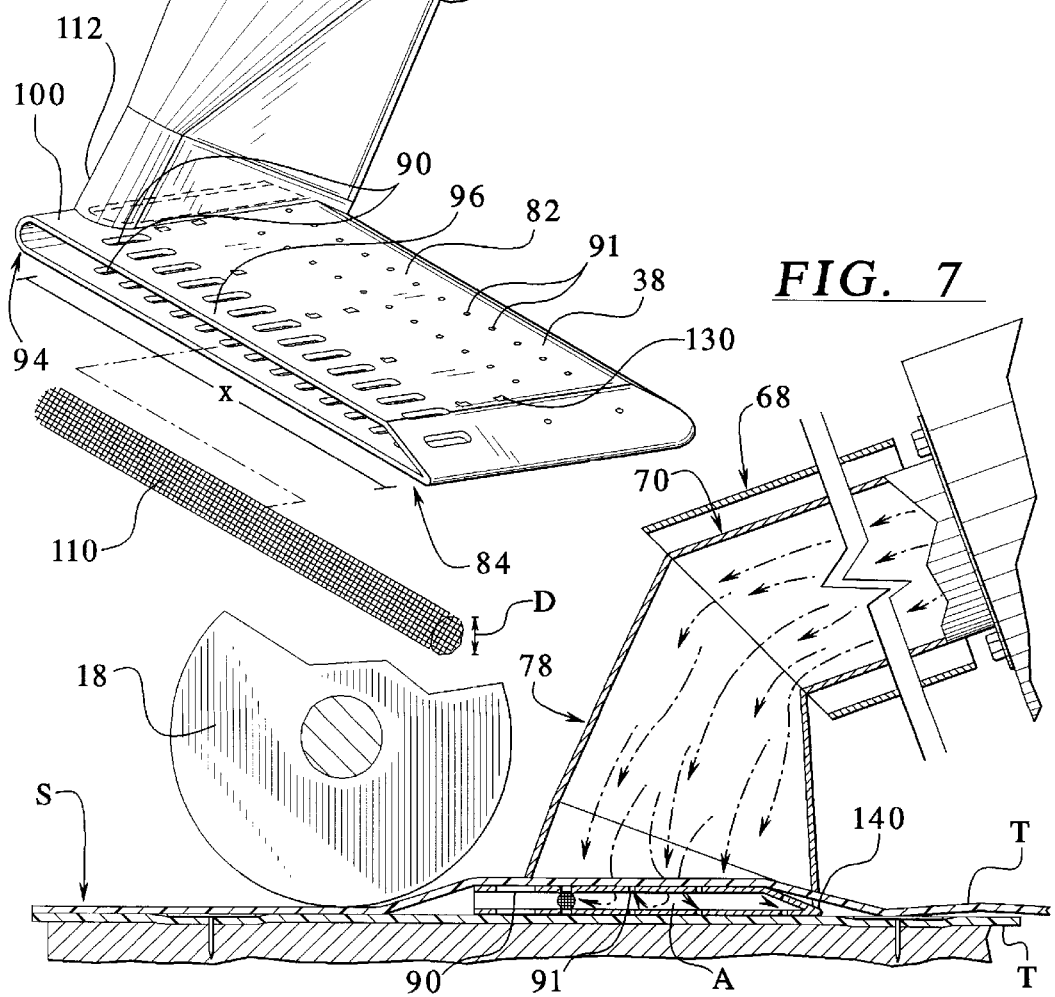
FIG. 7 is a cross-sectional side view of the nozzle during its application.

FIG. 7 illustrates the invention in a seam welding application. Here, the foot 38 is placed between the thermoplastic sheets T and is guided along the surface S. The lead end 140 of the foot 38 is embossed in order to gradually raise and separate the sheets T as the foot 38 moves across the surface S.

The direction of the air flow is shown in FIG. 7 by the arrows. The air stream is directed down the nozzle body 34 through the tapered section 78 and into the nozzle foot 38. As the air moves into the foot 38 the flow restrictor 110 restricts the output of air at the outlet 94. This restriction causes pressure to quickly build within section A of the foot 38. The increase in pressure creates a back flow of the air stream. The back flow causes the air stream to be evenly distributed across the foot 38. Thus, air is evenly distributed out the air vents 91. Also, the even distribution of this hot air causes the surface temp of the foot 38 to increase resulting in an even distribution of radiant heat across the top and bottom surfaces 82, 84 of the foot 38. As a result, the sheets T are preheated by convection and radiation. The preheating of the sheets T begins the melting process of the layer of plastic. The sheet then passes over the foot 38 to the outlet 94. The output of air at the outlet 94 assists the drum wheel 18 in fusing the plastics together.

It is seen that this invention provides a novel nozzle for a welding apparatus and method for manufacturing the same. It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A nozzle for a welding apparatus, the nozzle comprising:
    a hollow body to convey a stream of hot air;
    a hollow foot which is substantially rectangular in plan view on which has a top surface, a bottom surface and an outlet, the rectangular foot connected to and in fluid communication with the body;
    air vents on both the top and bottom surfaces; and
    a flow restrictor sufficient to cause even distribution of air flow out the air vents, the flow restrictor being positioned in the foot downstream from the air vents.

2. A nozzle for a welding apparatus, the nozzle comprising:
    a hollow body to convey a stream of hot air;
    a hollow foot which is substantially rectangular in plan view on which has a top surface, a bottom surface and an outlet, the rectangular foot connected to and in fluid communication with the body;

air vents on both the top and bottom surfaces;

a flow restrictor sufficient to cause even distribution of air flow out the air vents, the flow restrictor positioned in the foot; and air slots on the top and bottom surfaces across the width of the foot near the outlet, wherein the flow restrictor is between the air slots and air vents.

3. A welding apparatus for welding together overlapped thermoplastic sheets, the welding apparatus comprising:

a frame configured to be movable relative to the thermoplastic sheets;

a hot air source carried on the frame;

a nozzle to direct a stream of hot air generated by the hot air source, the nozzle having a first end and a second end, the first end attached to the hot air source, the second end configured as a welding member that is positioned between the thermoplastic sheets and being substantially rectangular in plan view and having an outlet;

a flow restrictor positioned in the second end and configured to create a back flow, the flow restrictor being removably insertable; and air vents on the top and bottom surfaces, wherein the back flow creates an even distribution of air flow out the air vents.

4. A nozzle for a welding apparatus, the nozzle comprising:

a hollow body to convey a stream of hot air;

a hollow foot which is substantially rectangular in plan view on which has a top surface, a bottom surface and an outlet, the rectangular foot connected to and in fluid communication with the body;

air vents on both the top and bottom surfaces;

a flow restrictor sufficient to cause even distribution of air flow out the air vents, the flow restrictor positioned in the foot downstream from the air vents and being removably insertable.

* * * * *